United States Patent [19]
Chen

[11] Patent Number: 5,947,560
[45] Date of Patent: Sep. 7, 1999

[54] LINEAR RECLINER WITH SINGLE POSITION MEMORY

[75] Inventor: Song Chen, Troy, Mich.

[73] Assignee: Fisher Dynamics Corporation, St. Clair Shores, Mich.

[21] Appl. No.: 09/067,068

[22] Filed: Apr. 27, 1998

[51] Int. Cl.[6] .................................. B60N 2/20; B60N 2/22
[52] U.S. Cl. ........................ 297/362.12; 297/363; 297/375
[58] Field of Search ............................. 297/361.1, 362.12, 297/363, 375

[56] References Cited

U.S. PATENT DOCUMENTS

| 5,344,215 | 9/1994 | Dahlbacka | 297/375 |
|---|---|---|---|
| 5,618,083 | 4/1997 | Martone et al. | 297/362.12 |
| 5,660,440 | 8/1997 | Pejathaya | 297/361.1 |
| 5,718,482 | 2/1998 | Robinson | 297/362.12 |
| 5,727,847 | 3/1998 | Martone et al. | 297/375 |
| 5,769,493 | 6/1998 | Pejathaya . | |
| 5,788,330 | 8/1998 | Ryan . | |
| 5,813,725 | 9/1998 | Robinson . | |
| 5,823,622 | 10/1998 | Fisher, IV et al. | 297/362.12 |

*Primary Examiner*—Anthony D. Barfield
*Attorney, Agent, or Firm*—Harness, Dickey & Pierce, P.L.C.

[57] ABSTRACT

A linear seat recliner for a vehicle seat having a single-position memory feature that permits the seatback to be returned to a predetermined upright "design" position after having been folded into a forward dump position.

19 Claims, 3 Drawing Sheets

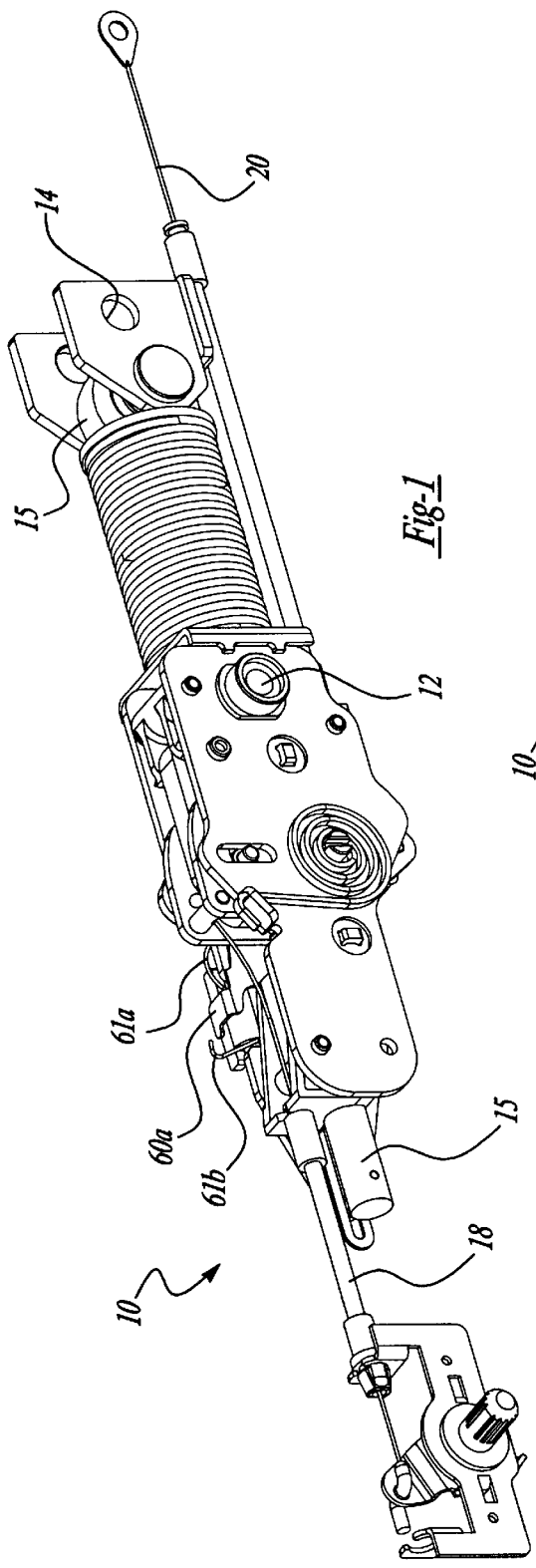
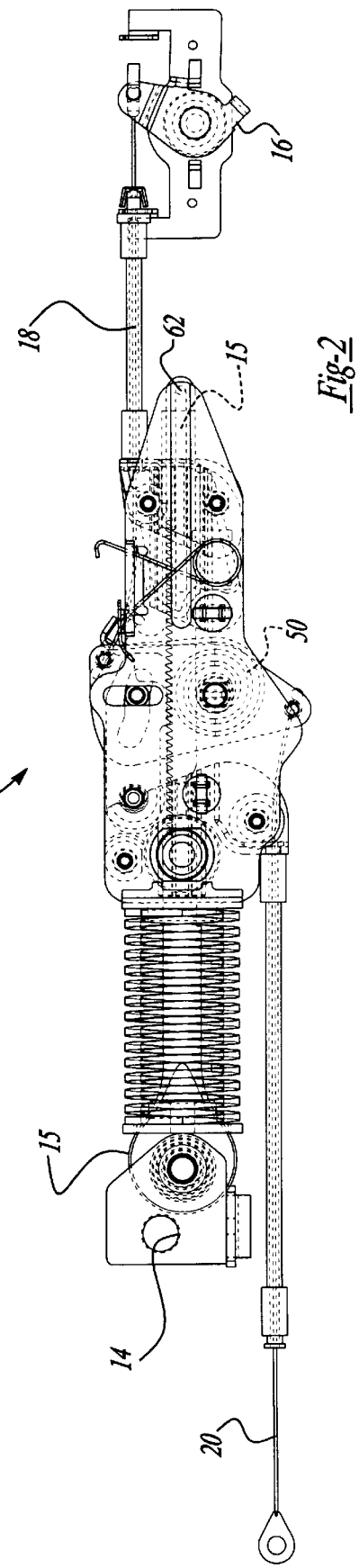

LINEAR RECLINER WITH SINGLE POSITION MEMORY

BACKGROUND OF THE INVENTION

Field of the Invention

The present invention relates to recliners for vehicle seats and, in particular, to a seat recliner having a memory feature for returning the seatback to a specified design position when the seatback is returned to an upright position after being dumped into a forward position.

BACKGROUND AND SUMMARY OF THE INVENTION

Vehicle seats typically are equipped with reclining mechanisms that enable the angulation of a seatback to be adjusted relative to the seat bottom. Recliner mechanisms adapted for use in two-door coupe-type vehicles having a back seat, or so-called "extended cab" pickup trucks, also typically included a dump-release mechanism which enables the seatback to be completely folded into the forward position to facilitate ingress and egress to and from the rear seat of the vehicle. The principal disadvantage with most seat recliner mechanisms used in vehicles of this type is that the recliner mechanism will engage in the forward-most angular position within its recliner adjustment range when the seatback is returned to an upright position from the dump position. The resulting angular position of the seatback can make it difficult for the front seat occupant to enter the vehicle without releasing the recliner mechanism and further adjusting the seatback to a more normal rearwardly angled position.

To address this problem, memory devices have been added to recliner mechanisms which "remember" the angular position of the seatback when released by the dump mechanism, and then automatically return the seatback to its original position when the seatback is returned to its upright position. While seat recliners equipped with memory devices of this type are effective in overcoming the above problem, such memory devices are typically quite complex and can therefore add significantly to the cost of the recliner. In addition, memory devices also add to the physical size of the recliner thus creating packaging problems in certain applications.

Accordingly, it is the principal object of the present invention to provide a seat recliner mechanism that incorporates a simple single position memory device that enables the seatback to be returned to a specified "design" position which facilitates easy entry of the seat occupant.

In addition, it is a further object of the present invention to provide a seat recliner mechanism with a single position memory device that is reliable, inexpensive to manufacture, and requires minor modification to the basic design of the seat recliner. Moreover, it is a further object of the present invention to provide a single position memory system that does not significantly enlarge the physical dimensions of the recliner mechanisms.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

FIG. 1 is a perspective view of a seat recliner mechanism according to the present invention;

FIG. 2 is a side view of the recliner mechanism shown in FIG. 1;

DETAILED DESCRIPTION OF THE PREFERRED EMBODIMENT

Figure 3:
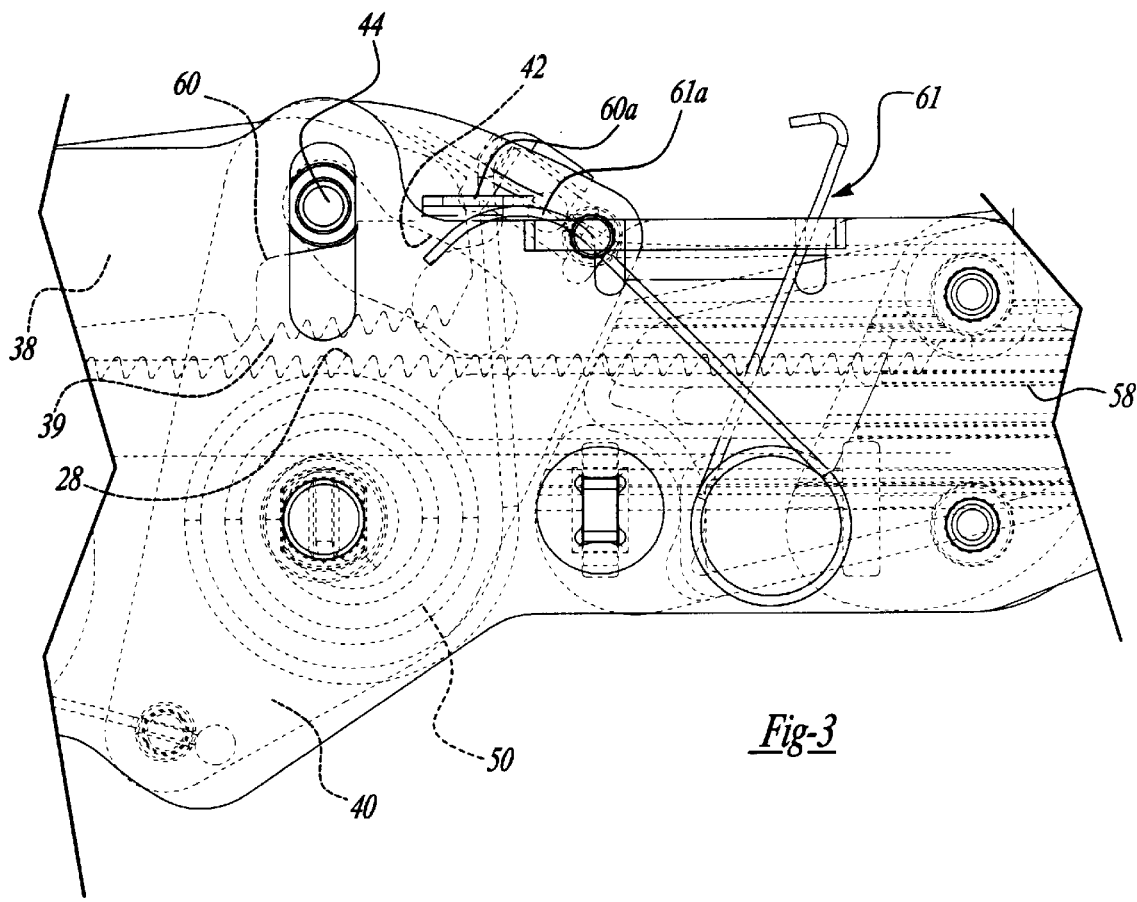
FIG. 3 is an enlarged side view of a portion of the recliner mechanism shown in FIG. 2.

Referring to FIG. 1, a perspective view of a linear seat recliner 10 according to the present invention is shown. The seat recliner is conventionally adapted to be pivotably connected to the frame of the vehicle seat bottom via a trunion mounting 12, and to a point on the seatback frame below the pivot point of the seatback via a rod bracket 14. A rotary release mechanism. 16 also connected to the seat bottom operates a cable 18 that serves to release the recliner mechanism in a manner to be described and thereby allows an elongated rod 15 to be linearly displaced relative to the seat bottom. Linear displacement of the rod 15 permits the movement of the rod bracket 14 relative to the seat bottom resulting in adjustment of the angular position of the seatback relative to the seat bottom. A dump release mechanism (not shown) typically located on the lower part of the rear of the seatback operates a second cable 20 which also releases the recliner mechanism to permit the seatback to be folded completely forward to permit access to the back seat of the vehicle.

As will readily be appreciated by those skilled in the art, the present linear seat recliner 10 can alternatively be located in the seatback of the vehicle seat. In particular, when positioned in this alternative manner, the seat recliner 10 is pivotally mounted via trunion mounting 12 to the seatback frame and the rod bracket 14 is connected to the seat bottom frame at a point located rearwardly of the pivot point of the seatback to the seat bottom. In all other respects, the recliner 10 operates in the same manner regardless of its mounting location in the seat bottom or the seatback.

Figure 5:
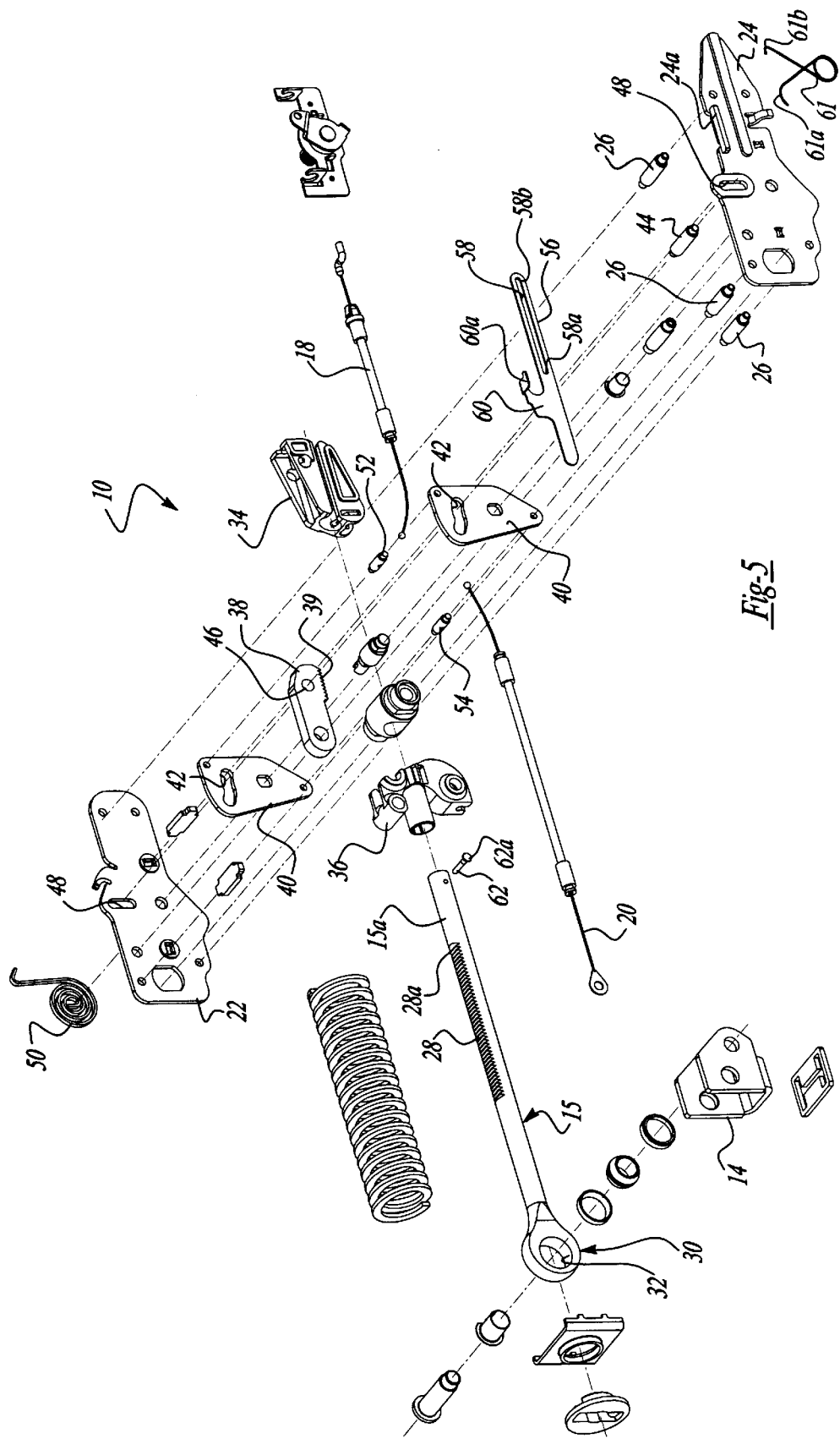
FIG. 5 is an exploded view of the seat recliner mechanism shown in FIG. 1.

Turning to FIG. 5, the recliner mechanism comprises an inner plate 22 and an outer plate 24 that are riveted together by a plurality of rivets 26. The rod 15 which has a plurality of teeth 28 formed along a segment of its upper surface, is supported for reciprocal axial movement relative to the plates 22 and 24 by a front rod guide 34 and a rear rod guide 36. The rod 15 has an enlarged rear end 30 with a bore 32 formed therethrough for securing the rear end of the rod 15 to the bracket 14. The rod 15 is secured against axial movement by a locking pawl 38 which pivots between a locking position in which teeth 39 formed on the pawl 38 engage the teeth 28 on the rod 15 and a release position wherein the locking pawl 38 is raised out of engagement with the rod 15. The locking pawl is pivoted into the release position by a pair of cams 40 positioned on either side of the locking pawl 38. Cams 40 are each provided with a curved slot 42 defining a cam follower path. A cam pin 44 which passes through a hole 46 in the locking pawl 38 extends through the curved slots 42 in both cams 40 and also through a pair of vertical slots 48 formed in each of the plates 22 and 24.

As best shown in FIG. 2, when the cams 40 are rotated in the clockwise direction, the cam pin 44 is elevated within slots 48 as it follows the cam follower paths defined by the curved slots 42 in the cams 40. Elevation of the cam pin 44 in turn causes the locking pawl 38 to be raised into the release position thereby freeing the rod 15 for linear movement. Conversely, when the cams 40 are rotated in the counterclockwise direction, the cam slots 42 drive the pin 44 downwardly, thereby pivoting the locking pawl 38 into engagement with the rod 15. A cam spring 50 is provided to bias the cams 40 in the counterclockwise direction to thereby bias the locking pawl 38 into the locking position. Rotation of the cams 40 is effected by actuation of either of the release cables 18 and 20 which are connected to the cams 40 via cable pins 52 and 54, respectively.

Figure 4:
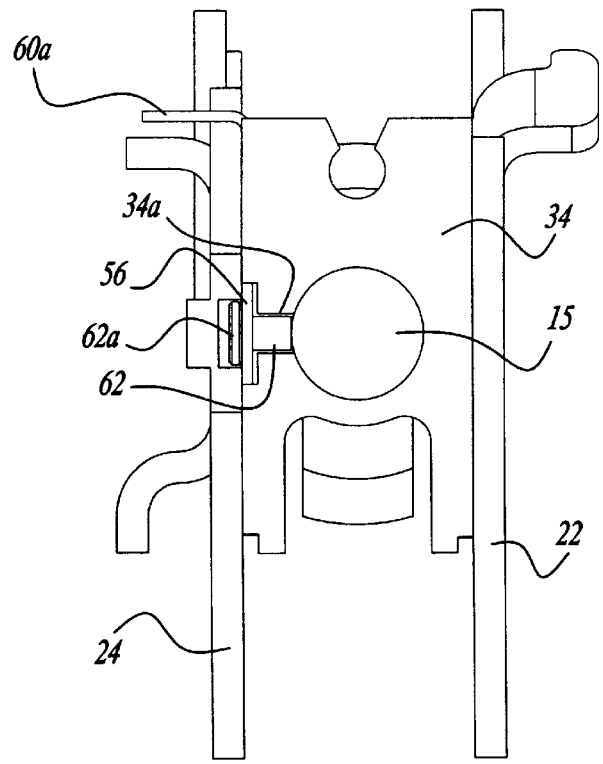
FIG. 4 is an end view of the recliner mechanism shown in FIG. 2 taken from line 4—4.

Referring to FIGS. 4 and 5, the single position memory feature of the present invention is provided by a trigger link 56 that is positioned alongside the rod 15 in a slot 34a formed in the front rod guide 34. The trigger link 56 in turn has an elongated slot 58 formed therein that is adapted to receive a transversely extending pin 62 secured to the front end of the rod 15. The rod pin 62 has an enlarged head portion 62a to ensure the pin is retained within the slot 58. The trigger link 56 further includes an upwardly projecting blocking tab 60 that is adapted to maintain the cam pin 44 in the elevated position within slots 48 when the seatback is dumped into its forward folded position. In particular, as best shown in FIGS. 2 and 3, during normal operation of the seat recliner, the rod pin 62 moves freely within the slot 58 in the trigger link 56 and consequently the trigger link 56 has no effect on the operation of the recliner 10. In other words, the length of the slot 58 in the trigger link 56 is sufficiently long to accommodate the linear displacement of the rod 15 within the normal seatback adjustment range of the recliner 10. However, when the recliner is released and the seatback folded forward into the dump position, the rod 15 moves rearwardly (to the left in FIG. 3) until the rod pin 62 engages the rearward end 58a (FIG. 5) of the slot 58 thereby driving the trigger link 56 rearwardly, which in turn causes the blocking tab 60 on the trigger link 56 to wedge beneath the raised cam pin 44. The length of the slot 58 in the trigger link 56 is such that the final incremental portion of linear travel of the rod 15 during folding of the seatback into the full forward position displaces the position of the blocking tab 60 of the trigger link 56 from the position shown in FIG. 2 to the blocking position wherein the blocking tab 60 is wedged beneath the cam pin 44 shown in FIG. 3. With the trigger link 56 in this blocking position, the locking pawl 38 is held in the disengaged position, thereby preventing the locking pawl 38 from immediately engaging the forward-most section of teeth 28a (FIG. 5) on the rod 15 when the seatback is returned to an upright position. In other words, absent the function of the trigger link 56, when the dump release cable 20 is released after the seatback is folded forward, the locking pawl 38 will return to its lowered "engaged" position due to the bias of cam spring 50. However, when the seatback is in the forward folded position, the position of the rod 15 is such that the teeth 39 of the locking pawl 38 simply contact the smooth untoothed forward portion 15a of the rod. If the seatback is then returned to an upright position, the teeth 39 of the locking pawl 38 will slide along the smooth untoothed portion 15a of the rod until they engage the forward-most section of teeth 28a on the rod, resulting in the seatback latching in a vertical position.

However, with the trigger link 56 according to the present invention, when the seatback is returned to an upright position, the locking pawl 38 is held in the release position by the blocking tab 60 until the rod 15 is displaced in the forward direction sufficiently to cause the rod pin 62 to engage the forward end 58b (FIG. 5) of the slot 58 in the trigger link 56. When this occurs, further forward displacement of the rod 15 causes the rod pin 62 to similarly displace the trigger link 56, thereby moving the blocking tab 60 from its blocking position beneath the cam pin 44 shown in FIG. 3 to the position shown in FIG. 2. This in turn immediately frees the locking pawl 38 to reengage the teeth 28 on the rod 15 under the bias force of cam spring 50. In the preferred embodiment, the length of the slot 58 in the trigger link 56 is configured so that the locking pawl 38 does not re-engage the teeth 28 on the rod 15 until the seatback is returned to a predetermined "design" position substantially in the middle region of the angular adjustment range of the recliner 10.

Finally, due to packaging considerations in certain seat applications, it is necessary to ensure that the trigger link 56 does not project excessively beyond the outer plate 24 when the seatback is adjusted to a position that displaces the rod 15 to the left in FIG. 2. Accordingly, for such applications a small bias spring 61 is provided that is connected between a distal end portion 60a of the blocking tab 60 on trigger link 60 and a boss 24a formed on outer plate 24. The bias spring 61 serves to urge the trigger link 60 toward the left in FIG. 2 when the rod 15 is moved in this direction from a fully reclined position. As best shown in FIG. 1, the curved end portion 61a of the spring 61 is configured to contact the distal end portion 60a of the trigger link 60 to prevent the trigger link 60 from moving into the blocking position under the bias force of spring 61. Moreover, as the trigger link 60 is moved into the position shown in FIG. 1, the opposite end 61b of the spring disengages from the distal end portion 60a of the trigger link 60 by virtue of the spring end 61 b contacting the boss 24a on the outer plate 24, thereby removing the spring bias force on the trigger link 60. However, when the trigger link 60 is pulled rearwardly (toward the left in FIG. 3) by the rod pin 62 engaging the end 58a of slot 58 in the trigger link 60, the distal end portion 60a easily biases the curved end portion 61 a of the spring 61 downward slightly to permit the trigger link 60 to move into the blocking position shown.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A linear recliner for an automotive seat having a seatback and seat bottom, the linear recliner enables the angular position of the seatback relative to the seat bottom to be adjusted within a predetermined adjustment range, said linear recliner comprising:

a body adapted for mounting to one of the seatback or a seat bottom;

an elongated member adapted for connection at one end to the other of said seatback or seat bottom and slidably supported by the body for reciprocal linear movement relative thereto for controlling the angular position of the seatback relative to the seat bottom;

a locking member movably supported by the body between an engaged position wherein the locking member is engaged with the elongated member so as to secure the elongated member against movement relative to the body and a release position wherein the locking member is released from the elongated member so as to free the elongated member relative to the body;

a release mechanism connected to the locking member for moving said locking member from the engaged position to the release position; and a blocking member operatively coupled to the elongated member such that movement of the elongated member causes the blocking member to move into a first blocking position for maintaining the locking member in the release position when the seatback is rotated into a forward folded position outside said predetermined adjustment range.

2. The linear recliner of claim 1 wherein said blocking member maintains the locking member in the release position until the seatback is returned from said forward folded position to a predetermined upright position other than the forwardmost position in said adjustment range, said predetermined upright position being independent of the position of the seatback prior to movement of the seatback into the forward folded position.

3. The linear recliner of claim 2 wherein said blocking member is movable between the first blocking position and a second position wherein the locking member is free to move into the engaged position.

4. The linear recliner of claim 3 further including coupling means interconnected between said elongated member and said blocking member for moving said blocking member from said second position to said first blocking position when the seatback is rotated into the forward folded position.

5. The linear recliner of claim 4 wherein said coupling means is further adapted to move said blocking member from said first blocking position to said second position when the seatback is returned from said forward folded position to said predetermined upright position.

6. The linear recliner of claim 5 wherein said blocking member comprises a longitudinal link that is slidably supported by said body adjacent to said elongated member.

7. The linear recliner of claim 6 wherein said coupling means comprises pin that projects transversely from said elongated member into a longitudinal slot formed in said longitudinal link, said longitudinal slot having opposite end surfaces.

8. The linear recliner of claim 7 wherein said pin moves freely within said slot when the position of the seatback is adjusted within said predetermined adjustment range.

9. The linear recliner of claim 8 wherein said pin engages one end surface of said slot to thereby move said blocking member into said first blocking position when the seatback is rotated into the forward folded position, and engages the opposite end surface of said slot to thereby move said blocking member into said second position when the seatback is returned from said forward folded position to said predetermined upright position.

10. A linear recliner for an automotive seat having a seatback and seat bottom, the linear recliner enables the angular position of the seatback relative to the seat bottom to be adjusted within a predetermined adjustment range, said linear recliner comprising:

a body adapted for mounting to one of the seatback or seat bottom;

an elongated rod having teeth formed along a portion of its length slidably supported by said body for reciprocal linear movement relative thereto and having an end thereof extending from said body and adapted for connection to the other of said seatback or seat bottom;

a locking pawl having teeth formed thereon and supported by said body for movement between an engaged position wherein the teeth of the locking pawl engage the teeth on said rod and a release position wherein the teeth on the locking pawl are disengaged from the teeth on said rod;

a cam member rotatably supported by said body and coupled to said locking pawl for moving said locking pawl from said engaged position to said release position;

a manually operated release mechanism coupled to said cam member for rotatably actuating said cam member; and a trigger link operatively coupled to said elongated rod for maintaining the locking pawl in said release position until the seatback is returned from a forward folded position outside said predetermined adjustment range to a predetermined upright position that is independent of the position of the seatback prior to movement of the seatback toward the forward folded position and that is substantially in a middle region of said adjustment range.

11. The linear recliner of claim 10 wherein said locking pawl has a pin that is engaged within a cam slot formed in said cam member such rotation of said cam member causes movement of said locking pawl.

12. The linear recliner of claim 11 wherein said trigger link is movable between a first blocking position wherein the locking pawl is maintained in the release position and a second position wherein the locking pawl is free to move into the engaged position.

13. The linear recliner of claim 12 wherein said trigger link includes a blocking member that is engaged with said locking pawl pin to maintain said locking pawl in said release position when said trigger link is in said first blocking position.

14. The linear recliner of claim 13 wherein said elongated rod has a rod pin that projects transversely therefrom into an elongated slot having opposite end surfaces formed in said trigger link.

15. The linear recliner of claim 14 wherein said rod pin moves freely within said slot when the position of the seatback is adjusted within said predetermined adjustment range.

16. The linear recliner of claim 15 wherein said rod pin engages one end surface of said slot to thereby move said trigger link into said first blocking position when the seatback is rotated into the forward folded position, and engages the opposite end surface of said slot to thereby move said trigger link into said second position when the seatback is returned from said forward folded position to said predetermined upright position.

17. A linear recliner for an automotive seat that enables an angular position of a seatback relative to a seat bottom to be adjusted within a predetermined adjustment range, comprising:

a body adapted for mounting to one of a seatback or seat bottom;

an elongated member adapted for connection at one end to the other of said seatback or seat bottom and slidably supported by the body for reciprocal linear movement relative thereto for controlling the angular position of the seatback relative to the seat bottom;

a locking member movably supported by the body between an engaged position wherein the locking member is engaged with the elongated member so as to secure the elongated member against movement relative to the body and a release position wherein the locking member is released from the elongated member so as to free the elongated member for movement relative to the body;

a release mechanism connected to the locking member for moving said locking member from the engaged position to the release position;

a blocking member operatively coupled to the elongated member for maintaining the locking member in the release position when the seatback is rotated into a forward folded position outside said predetermined adjustment range, wherein said blocking member comprises a longitudinal link that is slidably supported by said body adjacent to said elongated member; and a pin projecting transversely from said elongated member into a longitudinal slot formed in said longitudinal link, said longitudinal slot having opposite end surfaces.

18. The linear recliner of claim 17 wherein said pin moves freely within said slot when the position of the seatback is adjusted within said predetermined adjustment range.

19. The linear recliner of claim 18 wherein said pin engages one end surface of said slot to thereby move said blocking member into said first blocking position when the seatback is rotated into the forward folded position, and engages the opposite end surface of said slot to thereby move said blocking member into said second position when the seatback is returned from said forward folded position to said predetermined upright position.

* * * * *